United States Patent [19]

Cayias et al.

[11] Patent Number: 5,035,287

[45] Date of Patent: Jul. 30, 1991

[54] REDOX GEL PROCESS FOR MORE UNIFORM FLUID FLOW IN FORMATIONS

[75] Inventors: John L. Cayias; Susan M. Holley, both of Richardson; Gunter J. Lichtenberger, Dallas, all of Tex.

[73] Assignee: Oryz Energy Company, Dallas, Tex.

[21] Appl. No.: 559,612

[22] Filed: Jul. 30, 1990

[51] Int. Cl.$^5$ .................. E21B 33/138; E21B 43/22; E21B 49/00

[52] U.S. Cl. .................. 166/250; 166/252; 166/263; 166/270; 166/295; 166/300

[58] Field of Search ............ 166/270, 273, 274, 294, 166/295, 300, 250, 252; 405/264

[56] References Cited

U.S. PATENT DOCUMENTS

| | | | |
|---|---|---|---|
| 3,285,338 | 11/1966 | Boston | 166/270 |
| 3,386,509 | 6/1968 | Tulsa | 166/300 X |
| 3,658,129 | 4/1972 | Lanning et al. | 166/270 |
| 3,757,863 | 9/1973 | Clampitt et al. | 166/270 X |
| 3,762,476 | 10/1973 | Gall | 166/270 X |
| 3,785,437 | 1/1974 | Clampitt et al. | 166/281 |
| 3,833,061 | 9/1974 | Gall | 166/294 |
| 3,949,811 | 4/1976 | Threlkeld et al. | 166/294 |
| 4,287,951 | 9/1981 | Sydansk et al. | 166/281 |
| 4,343,363 | 8/1982 | Norton et al. | 166/295 X |
| 4,606,772 | 8/1986 | Almond et al. | 166/300 X |
| 4,630,678 | 12/1986 | Mumallah et al. | 166/295 X |
| 4,679,625 | 7/1987 | Gibbons | 166/270 |
| 4,693,310 | 9/1987 | Gibbons | 166/270 |
| 4,735,265 | 4/1988 | Hoskin et al. | 166/294 |
| 4,848,464 | 7/1989 | Jennings, Jr. et al. | 166/270 |
| 4,915,170 | 4/1990 | Hoskin | 166/295 X |

OTHER PUBLICATIONS

"Use of Polymers to Control Water Production in Oil Wells," *J. Petroleum Technology*, Feb. 1973, J. L. White et al.

D. Noran, "Producing Wells Respond to Polymer Treatments," *Oil and Gas Journal*, Nov. 24, 1975.

C. Huang et al., "An Experimental Study of the In-Situ Gelation of Chromium (+3)/Polyacrylamide Polymer in Porous Media," *SPE Reservoir Engr.*, Nov. 1986.

J. R. Gales et al., "Equilibrium Swelling and Syneresis Properties of Xanthan Gum–Cr (III) Gels," SPE/DOE, 17328, 1988.

J. D. Purkaple et al., "Evaluation of Commercial Crosslinked Polyacrylamide Gel Systems for Injection Profile Modification," SPE/DEO 17331, 1988.

*Primary Examiner*—George A. Suchfield
*Attorney, Agent, or Firm*—Pravel, Gambrell, Hewitt, Kimball & Krieger

[57] ABSTRACT

A metal-containing oxidizing solution is injected through wellbores which reacts in a subterranean reservoir which has naturally-ocurring reduction capacity to form a slightly soluble compound of metal having a valence of +3. Thereafter, the metal crosslinks a water-soluble polymer which is injected into the metal-containing pore volume resulting in a decreased flow in the treated portion of the reservoir.

18 Claims, No Drawings

REDOX GEL PROCESS FOR MORE UNIFORM FLUID FLOW IN FORMATIONS

BACKGROUND OF THE INVENTION

1. Field of the Invention

The present invention relates to a method for reducing the flow of fluids through a permeable formation at distances beyond the near wellbore region around wells, to achieve more uniform flow of fluids in subterranean rocks. More particularly, a method for in situ crosslinking of water-soluble polymers is provided which applies to processes in which fluids are injected or produced through wells for recovery of hydrocarbons or other minerals and for any other purpose involving flow of fluids.

2. Discussion of Related Art

In an effort to recover greater amounts of oil by injection of water or other fluids into wells, the petroleum industry has expended considerable effort in developing a variety of methods to achieve a more uniform flow of fluids through subterranean formations. Non-uniform flow, caused largely by variations of permeability of rock, leads to lower recovery of oil and increased cost of injection processes. Often the non-uniform flow arises from the presence of high permeability channels, which may be caused by varying depositional environments when the subterranean rock is formed, by natural or induced fractures or by dissolution of the rock to form vugs. In either case, there is a need to increase the flow resistance and thereby decrease the flow through the higher permeability zones.

A method widely investigated in the petroleum industry for increasing the flow resistance of higher permeability zones is the use of water-soluble polymers. It has been found that these polymers can be made more effective as permeability-reduction agents if the polymer molecules are crosslinked, which causes them to form a very viscous solution or a gel. Commonly used polymers, such as polyacrylamide, contain negatively charged ionic groups, so crosslinking by ionic forces can be achieved by charged polyvalent metal ions, preferably with a positive charge of 3. The polymers cannot be injected into many rocks if the cross-linking occurs before the polymer solution is injected, because the viscosity of the solution becomes too high; therefore, means are sought for providing a delayed crosslinking.

An early method for delayed crosslinking of polymers injected into wells was disclosed in U.S. Pat. No. 3,762,476. Injection of alternate slugs of polymer solution and metal ions which are retarded in their availability for crosslinking was proposed. The polymer and metal ions mix by flow in the rock to form a gel or viscous solution. Later, the same inventor proposed in U.S. Pat. No. 3,833,061 that, for oil-wet rocks, an oxidizing agent such as sodium dichromate solution be injected and flowed through the reservoir first, to remove any oil film from the surface of the rock, and be followed by a polymer solution, then by a complexing solution of metal ions retarded in their crosslinking action, then followed by a second polymer solution. The polymer and metal ions mix by flow in the rock to form a gel or viscous solution.

An early proposal for use of an oxidation-reduction reaction to achieve delayed crosslinking of polymers in a subterranean rock was in U.S. Pat. 3,785,437. This system utilized either an oxidizing or a reducing chemical in a polymer solution. Alternate slugs of the polymer solution are injected with a solution of the opposite type chemical to that in the polymer solution. The oxidation-reduction reaction occurs between the two chemicals in the alternating slugs of liquid by mixing of the liquids in the rock, causing the formation of a multivalent metal ion which can crosslink the polymer. The crosslinking is said to be possible out in the formation away from the treating well. Oxidizing agents suggested include chromates and reducing agents include sulfides and sufites.

U.S. Pat. No. 3,949,811 proposed alternate slugs of polymer solution with brine containing high concentrations of divalent or trivalent ions such as iron, aluminum, magnesium and chromium. Use of different degrees of ionic content of the polymer was disclosed. No provision was made for delaying the activity of the metal ion other than by the mixing of fluids by flow through the rock and no oxidation-reduction reactions occur.

U.S. Pat. No. 4,343,363 addresses the problem of plugging of the injection face of the rock in a well by polymers. An acidic aqueous solution is injected which contains an oxidizing agent such as sodium dichromate which degrades the polymer on the face of the rock, thereby forming a metal ion which can crosslink a polymer; a spacer is injected and followed with more polymer solution, which will plug the face of the rock again; then the process is repeated.

Articles reviewing the use of crosslinked polymers for modifying flow patterns in subterranean rocks have been recently published. Paper SPE/DOE 17331, "Evaluation of Commercial Crosslinked Polyacrylamide Gel Systems for Injection Profile Modification," by J.D. Purkaple and L.E. Summers describes detailed tests of 15 commercially available polyacrylamide polymers crosslinked with chromium ion formed in an oxidationreduction reaction.

The use of water-soluble polymers to decrease flow in zones which are causing inefficient displacement processes has significant utility, but improved methods are needed to allow crosslinking and gel formation far removed from wells, where pressure gradients are lower. Gel formation in a volume of the reservoir where pressure gradients are lower will allow the gel to block flow more effectively because the gel will not be displaced by high pressure gradients that exist near i0 wells. The method of this invention allows placement of the gel over a large portion of the area swept by the injection fluids. This will result in permeability reduction of high permeability zones and improvement of the sweep efficiency throughout the reservoir.

SUMMARY OF THE INVENTION

In a reservoir that has chemical reactivity to reduce an oxidizing chemical, a solution containing a metal at a valence state greater than three is injected. A sufficient time is allowed for the metal solution to react with components of the reservoir and be reduced. A polymer solution containing a polymer that can be crosslinked by the reduced metal of valence three is then injected. The polymer moves through the rock and is crosslinked by the trivalent metal, and the gel formed greatly decreases the flow of water in the zone treated. Since the trivalent metal is formed by a chemical reaction between the reservoir rock and a very soluble compound having a higher valence state, it can be formed far removed from the well. Thus, polymer is crosslinked and resistance to flow of water is increased at distances removed from the near wellbore region.

In another embodiment of the invention, injection of an aqueous solution of a metal-containing oxidizing compound which can react to form a reduced compound in which the metal has valence +3 and is essentially immobile in the reservoir is followed by a time sufficient to allow the oxidizing compound to partly react and then an aqueous solution of a water-soluble polymer which can be crosslinked by the metal is injected. Suitable oxidizing chemicals are from compounds containing transition group metals, such as chromates, dichromates and vanadates. Suitable polymers are polysaccharide biopolymers and polyacrylamides.

DESCRIPTION OF PREFERRED EMBODIMENTS

In this invention, the term reservoir denotes bodies of porous, fluid-filled (gas or liquid) subterranean rock with adequate permeability to allow the movement of these fluids in response to external influences such as fluid injection and fluid withdrawal. We have found that at least some reservoirs contain rock or fluids which react with oxidizing chemicals in an oxidation-reduction reaction. Therefore, injection of a reducing chemical to react with a metal-containing oxidizing solution is not required. Rather, the naturally-occurring reduction capacity of the reservoir can be used for this purpose.

Design of the process according to this invention is improved by certain tests which reveal more information concerning the physical and chemical conditions in the reservoir in which the invention will be applied. This information may include results of tests in which a non-reactive tracer material is added to injected fluid in one well and concentrations of the tracer are monitored in offset wells. This test will allow more accurate determination of the volume of high-permeability rock that requires treatment and, therefore, the amount of metal solution and polymer solution that should be injected. Such tests of channelling in reservoirs are well-known to those in the art. Without this tracer information, surrounding producers may be closely monitored to determine breakthrough of injected water, metal compound or polymer during the practice of this invention, which can serve as a method of obtaining information on fluid channeling occurring in the reservoir and the volume of polymer needed.

Other information that is helpful to the design and application of this process is a measure of the reductive capacity of the formation where it is to be applied. Also, information on the rate at which an oxidation-reduction reaction occurs in the rock is useful. These quantities are preferably measured in situ using tracer techniques, as described in our co-pending Patent Application "In situ Measurement of Chemical Reducing Capacity of Porous Media," filed on even date herewith. If the reservoir does not have sufficient reductive capacity to reduce at least enough metal to crosslink a substantial part, say 20 per cent, of the polymer injected, it is not suitable for the practice of this invention. Nevertheless, it may not be economic to perform a measure of reductive capacity in every case before an attempt is made to practice this invention, and the employment of this invention is not limited to reservoirs in which reductive capacity tests have been performed.

The process of this invention is normally employed by injecting the chemicals into a well in which flooding fluid, such as water, carbon dioxide, nitrogen or a surfactant solution is being injected to drive oil in the reservoir to a producing well. The process can also be employed in wells being used for production of fluids from the reservoir. In this case, the metalcontaining solution, the polymer solution and a postflush are injected and the well is then returned to production. Alternately, the metal-containing solution can be injected into one well until it is produced from a second well, spaced apart from the first well, and the polymer solution can then be injected into the second well. In fields where injection wells and producing wells exist in patterns, such as five-spot patterns, either or both types of wells may be treated by this invention. Usually wells drilled into formations producing hydrocarbons will be treated by the methods of this invention, but any types of wells may be treated, such as wells used for extracting or leaching minerals from the earth or wells used for disposing of liquids into the earth.

The metal solutions suitable for practice of this invention include all water-soluble or water-dispersible chemicals that contain a metal ion source of higher oxidation or valence state than +3 that can be reduced to an oxidation or valence state of +3. Preferably, the metal will have solubility less than 100 ppm in an aqueous solution having a pH in the range of pH of waters found in the reservoir after it is reduced. The metal will form a precipitate or a separate reduced mobility phase that becomes essentially immobile in the rock and will not be readily displaced by the succeeding polymer solution. The range of pH of waters in most hydrocarbon reservoirs is from about 4 to 8. An additional requirement for the metal ion in the +3 valence state is that it will crosslink a water-soluble polymer such as polyacrylamide or xantham gums (biopolymers) so as to form a gel. The following metals are suitable: chromium, vanadium, molybdenum, manganese, niobium, ruthenium, iridium, cerium and bismuth. Preferably, sodium or potassium dichromate is used.

Technical grade oxidizing chemicals are suitable for the practice of this invention. Suitable concentrations are from 50 ppm to 10,000 ppm in an aqueous solution. This solution may be fresh water or may be naturally-occurring brine solutions or may be any other brine solution suitable for injection into the reservoir. Suitable ratios of oxidizing chemical to polymer are between 0.01 and 1.0, preferably in the range 0.05 to 0.2 by weight.

Polymers suitable for this invention include polyacrylamides and xanthan biopolymers. Preferably, the polyacrylamide is produced by an emulsion polymerization or solution process. The molecular weight range of the polyacrylamide is from 1 million to 20 million, with the preferred range being 2 million to 5 million. The polymer is anionic, and may be hydrolyzed up to 30 per cent, but is preferably hydrolyzed up to 2 per cent. Commercial polyacrylamide polymer suitable for the practice of this invention is IDF 193A, sold by Nalco Chemical Company of Chicago, Illinois. The molecular weight of this polymer is in the range of 1 million to 20 million and the degree of hydrolysis is less than 2 per cent. Suitable concentrations are within the range of 50 to 50,000 ppm in the aqueous solution, and preferred concentrations are in the range of 2,000 to 10,000 ppm in the aqueous solution.

In some formations the reductive capacity, as determined by the tracer technique described in our co-pending Patent Application "In situ Measurement of Chemical Reducing Capacity of Porous Media," filed on even date herewith, or by experience in a certain reservoir using the methods of this invention, may be much higher than needed for practice of this invention. In this case, it is desirable to inject an oxidizing chemical ahead of the metal solution, such that excess metal will not be deposited in the near wellbore region. Suitable non-metallic oxidizing agents include oxygen or oxygen-saturated water, air, hydrogen peroxide, and compounds containing oxygen and a halogen atom, such as sodium hypochlorite, sodium perchlorate, sodium iodate, and sodium bromate. The metal-containing oxidizing solution is injected following the non-metallic solution and followed by polymer solution.

Laboratory testing is also an important part of the process design. Testing should include evaluation and analysis of the oil, formation or produced water and injection water for chemical requirements. Bulk gel evaluations and core flow experiments, well-known to those in the art, are undertaken at reservoir temperature using the various waters and salinities to decide which chemical materials are best suited for the application. From this work, it is also possible to determine the range of chemical concentrations yielding the best gels and the optimum flow resistance and process design in the rock. Chemical selection considerations include concentrations, water-soluble polymer type, such as xanthan gums or polyacrylamides, polymer molecular weight, and the degree of hydrolysis of the polymer.

Once the results of the process design work and the reductive capacity test, if performed, have been assimilated into a treatment design and procedure, the well treatment can begin. A comprehensive reservoir characterization program consisting of pressure monitoring and testing, production logging and tracer work, all well-known techniques in the art, is recommended to fully evaluate results before and during treatments. Through this testing and careful sampling and analysis of the produced fluids, on-the-spot decisions about the treatment progress can be made, if necessary. Prior to treatment, maximum injection pressure limits should be established, based upon injection and wellhead equipment limitations. Pretreatment conditions must be maintained to assure polymer injection into the same regions of the reservoir as the preceding metal ion placement. If the injection pressure has increased to near the maximum allowable in a well, polymer injection is ceased. As wells are treated and the results more fully evaluated, future treatments are better designed to yield maximum recoveries of hydrocarbons. Concentrations of polymer may be changed, the amount of metal-containing solution may be changed, or different wells may be treated, for example, to increase the amount of oil production or decrease the amount of water produced with the oil. The gel formed by a metal and polymer may continue to form in the rock with time, so it may be advantageous to shut-in fluid injection or production in wells to allow more time for gel to form in the pore spaces of the rock or in fracture zones in the rock in some instances. If it is desirable to move the metal-containing oxidizing solution farther from an injection well, water or brine not containing the metal is injected following the metal solution and before the polymer is injected.

EXAMPLE 1

The method was applied to a pilot area in the Dundee formation in Michigan, consisting of two adjoining 10-acre five-spot patterns with six peripheral injectors and two producers. The average formation thickness is about 60 feet at a depth of 3350 feet, with a porosity of 7.3 per cent. Core air permeabilities ranged from 0.5 to 5200 millidarcies, with a Dykstra-Parson permeability variation coefficient of 0.91 for the field. Interwell tracer tests showed that a 2-foot thick thief zone was taking about 50 per cent of the injected water. In the first injection well, a slug of water containing 1075 pounds of sodium dichromate at a concentration of 700 ppm was injected at a rate of 250 barrels per day. Then 80 barrels of fresh water was injected to move the dichromate away from the near wellbore region. Injection of a solution of Dow Chemical Company J-279 polyacrylamide at a concentration of 2,100 ppm followed. The molecular weight of the polymer is from 2 million to 6 million, and the degree of hydrolysis is less than 5 per cent. Only 840 pounds of polyacrylamide was injected before the surface pressure limit was reached. An extensive reservoir characterization and production sampling program indicated that the treatment was successful in blocking off the thief zone and diverting water to new zones, so five more wells were treated. In an effort to continually improve the process design, each treatment was varied in terms of dichromate and polymer concentrations and volumes. On the average the dichromate solution injection volume was 78% of the thief zone volume and the polymer volume was 27% of the thief zone volume. The appearance of a small amount of a chrome (+3) precipitate in one of the producing wells proved that the chrome was being reduced in the reservoir and the chrome was being propagated through the reservoir before it was reduced and made only slightly soluble. There was a 40% reduction in water production from the two producing wells.

EXAMPLE 2

An injection well in the Caddo Limestone formation at a depth of 3200 foot and a temperature of 115° F. was treated with the redox gel process of this invention. Following a preflush with fresh water, a slug of 7420 barrels of water containing 450 ppm sodium dichromate was injected over seven days. Then a spacer consisting of 3430 barrels of fresh water was injected, and followed by a 6930 barrel slug of water containing 4730 ppm of Nalco Chemical Company IDF 193A emulsion polyacrylamide. The molecular weight of this polymer was from 3 million to 5 million and its degree of hydrolysis was less than 1 per cent. The polymer solution was injected for seven days. During injection, the pressure increased only slightly at the injection well, so the well was shut-in for four days to allow for additional gelation of the polymer to occur in the reservoir. In an offset production well, water production decreased from 2400 barrels per day to only 1150 barrels per day when the injection well was shut-in. This water production decrease was sustained for more than 10 months, even though water injection in the treated well was shut-in for only four days of that time.

Having described the invention above, various modifications of the techniques, procedures, material and equipment will be apparent to those in the art. It is intended that all such variations within the scope and spirit of the appended claims be embraced thereby.

We claim:

1. A method for obtaining a more uniform flow of fluids in a subterranean reservoir in fluid communication with one or more wellbores comprising:
   (a) injecting into the reservoir an aqueous solution of oxidizing compound containing a metal at a valence state greater than +3 that can be reduced to a valence state of +3 in an oxidation-reduction chemical reaction;
   (b) permitting the solution to remain in contact with the reservoir for a time sufficient to allow the oxidizing compound partly to undergo a chemical reduction reaction with the reservoir; and
   (c) thereafter injecting into the reservoir an aqueous solution of a water-soluble polymer which is capable of being cross-linked by the metal to increase the resistance to fluid flow.

2. The method of claim 1 further comprising injecting an aqueous spacer solution after step (a) and before step (c) to displace the solution containing the metal away from the injection well.

3. The method of claim 1 further comprising injecting an aqueous solution of an oxidizing compound not containing a metal before step (a) to consume some of the reduction capacity of the formation.

4. The method of claim 1 further comprising ceasing of injection to allow further time for the water-soluble polymer to increase the resistance to fluid flow.

5. The method of claim 1 further comprising a test performed before step (a) to measure the reductive capacity of the reservoir.

6. The method of claim 1 further comprising a test performed before step (a) to measure the volume of rock requiring treatment.

7. The method of claim 3 wherein the oxidizing compound not containing a metal is air, oxygen, or hydrogen peroxide.

8. The method of claim 3 wherein the oxidizing compound not containing a metal is selected from the group of compounds containing a halogen and oxygen.

9. The method of claim 1 wherein the oxidizing compound containing a metal at a valence state greater than +3 is a dichromate, chromate, or vanadate.

10. The method of claim 1 wherein the oxidizing compound is a compound of molybdenum, manganese, niobium, iridium, cerium or bismuth.

11. The method of claim 1 wherein the polymer is a polyacrylamide or a polysaccharide biopolymer.

12. The method of claim 11 wherein the polyacrylamide has a molecular weight between 1 million and 20 million and a degree of hydrolysis up to 40 per cent.

13. The method of claim 11 wherein the polyacrylamide has a molecular weight between 2 million and 6 million and a degree of hydrolysis up to 5 per cent.

14. The method of claim 11 wherein the concentration of polyacrylamide in the aqueous polymer solution is between 50 ppm and 50,000 ppm.

15. The method of claim 11 wherein the concentration of polyacrylamide in the aqueous polymer solution is between 2,000 ppm and 10 000 ppm.

16. The method of claim 1 wherein the solution containing the oxidizing compound is injected into a first well and the solution of water-soluble polymer is injected into a second well spaced apart from a first well.

17. A method of decreasing fluid flow through a reservoir comprising:
   (a) injecting into the reservoir an aqueous solution of a metal-containing oxidizing compound which can react to form a reduced compound in which the metal has valence +3, the reduced compound being essentially immobile in the pore spaces of the reservoir;
   (b) permitting the injected aqueous solution to remain in contact with the reservoir for a time sufficient to allow the oxidizing compound partly to undergo a chemical reduction reaction; and
   (c) injecting into the reservoir an aqueous solution of a water-soluble polymer which is capable of being crosslinked by the metal to decrease the fluid flow through the reservoir.

18. The method of claim 17 wherein the metal compound formed in step (a) is a solid having a solubility of less than 100 ppm under conditions in the reservoir.

* * * * *

UNITED STATES PATENT AND TRADEMARK OFFICE
CERTIFICATE OF CORRECTION

PATENT NO. : 5,035,287
DATED : July 30, 1991
INVENTOR(S) : John L. Cayias, et al It is certified that error appears in the above-identified patent and that said Letters Patent is hereby corrected as shown below:

On the title page, item [73] should read --Oryx Energy Company--

Signed and Sealed this

Fourteenth Day of January, 1992

Attest:

HARRY F. MANBECK, JR.

*Attesting Officer*  *Commissioner of Patents and Trademarks*